US005293354A

United States Patent [19]

Costabile

[11] Patent Number: 5,293,354

[45] Date of Patent: Mar. 8, 1994

[54] REMOTELY ACTUATABLE SPORTS TIMING SYSTEM

[76] Inventor: Michael J. Costabile, P.O. Box 1445, Hillsborough, N.C. 27278

[21] Appl. No.: 106,122

[22] Filed: Aug. 12, 1993

[51] Int. Cl.[5] ........................ G04G 8/00; G04B 47/06; H04B 1/34

[52] U.S. Cl. ........................................ 368/11; 368/113; 455/100

[58] Field of Search ..................................... 368/10-12, 368/107-113; 455/40, 66, 100; 340/323 R, 309.15, 309.4

[56] References Cited

U.S. PATENT DOCUMENTS

| | | | |
|---|---|---|---|
| 3,846,704 | 11/1974 | Bessette | 340/331 |
| 4,186,388 | 1/1980 | Robinson | 340/556 |
| 4,371,945 | 2/1983 | Karr et al. | 364/561 |
| 4,627,620 | 12/1986 | Yang | 273/1 GC |
| 4,834,374 | 5/1989 | Elstein et al. | 273/26 R |
| 4,885,797 | 12/1989 | Leather et al. | 455/40 |

*Primary Examiner*—Vit W. Miska

*Attorney, Agent, or Firm*—Irving M. Freedman

[57] ABSTRACT

A remotely actuatable sports timing system automatically responds to a whistle blown by the sports official to generate a frequency modulated radio signal which is utilized to provide an instantaneous switching signal to actuate the game clock.

25 Claims, 2 Drawing Sheets

REMOTELY ACTUATABLE SPORTS TIMING SYSTEM

This invention relates to a remotely actuatable sports timing system such as a digital display clock utilized in basketball games.

In many sports such as basketball the contest is divided into specific time periods. However, certain activities such as a foul called by the sports official require the stopping of the game clock. The signal for stopping the clock is the blowing of a whistle by the sports official, which the official timer upon hearing it responds by manually presses a stop button to stop the game clock. When play resumes the official timer presses a start button to restart the running of the game clock and the timing of the current period; or in the case of the last period, the time remaining in the game.

Because game scores are frequently very close, the time remaining is often determinative of whether a team can turn a trailing score into a winning score. Time is normally counted on a digital display clock utilizing increments of seconds and tenths of a second.

The official timer's delayed reaction time in translating a whistle blast of an official on the floor into a manual response to stop the game clock, or to stop or start other timers (such as the shot clock) is frequently accepted as human errors that simply can't be overcome. It is not uncommon, particularly during the remaining few seconds of a closely contested basketball game to have situations which require a conference of the three officials on the floor to estimate such human errors in the operation of the game clock, and to require resetting of the game clock to add time such as one or more seconds to the game clock which in their considered judgement compensates for the human error and delay in response of the official timer. Since a scoring basket which may reverse the entire outcome of the game can be obtained in as short a time period as one second, accuracy in timing can lead to controversies and differences of opinion crucial to accurate adherence to the rules and to the actual outcome of the game.

Certain other events in sports are also timed such as the shot clock and inbounding the ball. Timing is of critical importance in other sports such as football, wrestling, hockey, and lacrosse.

As a result it has been highly desirous to have an accurate, substantially instantaneous, reliable automated timer response to the whistle signals of a sports official.

However, an automated remote timing system must operate in a hostile and difficult environment where there is audible noise interference from numerous sources such as spectators, bands, cheerleaders and a public announcing system; and electronic interference from numerous electronic and electrical systems such as the television cameras and transmission, voice communication transmissions from and between security and television personnel, and the public announcing system. To complicate matters further, a sports event such as a basketball game is frequently conducted in a closed sports arena, confining the interferences and setting up echo and other overlapping interference patterns.

To still further compound the problem, the sports officials must continuously move around, and even run around, the playing area such that their whistle signal may be emitted while moving, at various locations and with surrounding players who are also moving. Moreover, it is desirable to enable the official timer to also operate the timer in the event of any failure of the automated remote control. Still further, it is highly desirable to have a built in test capability to test operation of the timing system prior to a game.

In summary, it is highly desirable to be able to provide a timing system which automatically and instantaneously responds to the whistle of a moving official in the harsh audible and electronic interference environment of a sports event.

OBJECTS AND SUMMARY OF INVENTION

It is an object of the present invention to provide an improved remotely actuatable sports timing system which is automatic in responding to audible signals of multiple sports officials.

It is another object of the present invention to provide a remotely actuatable sports timing system which responds to a whistle blown by any of a plurality of sports officials moving about the playing area.

It is yet another object of the present invention to provide a remotely actuatable sports timing system which is substantially instantaneous in response and which operates in the presence of interfering audio signals.

It is still another object of the present invention to provide a remotely actuatable sports timing system which utilizes a radio link and yet which is capable of reliable operation in the presence of potentially interfering radio signals.

It is a further object of the present invention to provide a remotely actuatable sports timing system signal actuator which is suitable for the sports officials to carry without interfering with their normal methods of officiating, and which enables both automatic and manual operation.

It is a still further object of the present invention to provide a remotely actuatable sports timing system which incorporates a built-in testing capability, and which is operable in conjunction with manual operation by the official timer.

In accordance with one form of the invention a remotely actuatable sports timing system includes a manually operated digital timer with parallel operation by a radio control signal generated by a portable radio transmitter carried by the sports officials including a microphone in proximity to their whistles to transmit a radio control signal to one or more stationary radio receivers which are connected to, and/or at the official timer position. The receivers are made responsive to the radio control signal to generate a switching signal to automatically operate the digital timer even in the presence of audible and electronic interference.

Each of the radio transmitters carried by a plurality of sports officials may be tuned to a different carrier frequency and the correspondingly tuned receivers may be positioned and spaced about the playing area to provide a timer stop control signal in response to the blowing of a whistle, or manual actuator of a stop button by a sports official. The manual stop signal is generated by a tone board at a frequency different than that of the whistle, and band pass filters at the radio receivers pass the stop signals.

Manual operation by the official timer is possible through manual stop and start buttons connected in parallel with the remotely generated automatic stop and start control. A remotely actuated timer start control may also be included.

Figure 1:
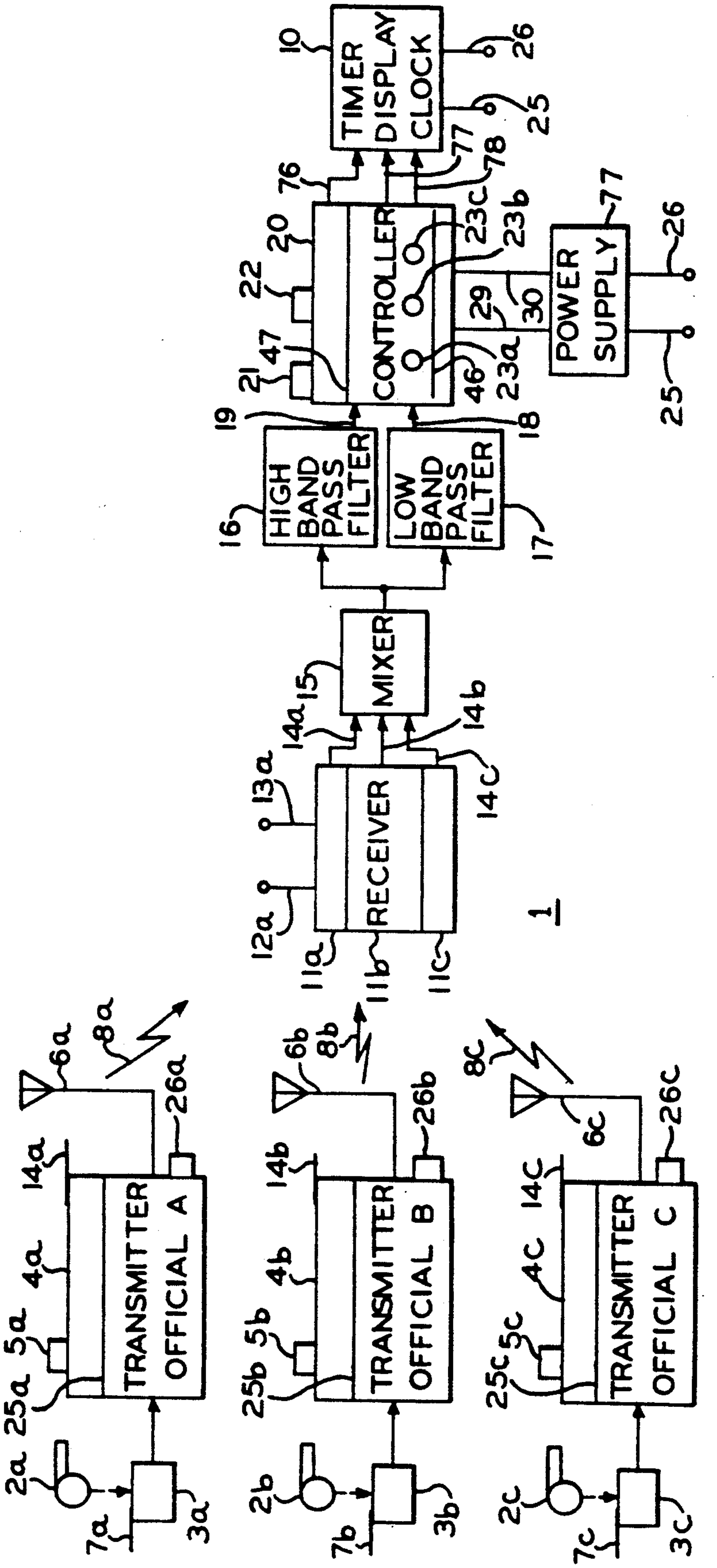
FIG. 1 is a block diagram of a remotely actuatable sports timing system incorporating the present invention.

Referring first to FIG. 1. The remotely actuatable timing system 1 is provided to actuate timer display clock 10 in response to the sounding or blowing of any of the sports whistles 2a, 2b and 2c carried by the sports officials officiating a sporting event. The sounding of any whistle 2a, 2b or 2c constitutes a signal for the actuation of timer display clock 10, such as to turn it off. Timer display clock 10 may be a Unitek digital display clock with tenths of a second capability. The whistles 2A, 2B and 2C may, for example, be Fox 40 whistles manufactured by Fortron Inc. which is the standard whistle used in the National Basketball Association (hereinafter NBA) and also utilized by college and high school basketball teams. Such whistles include no moving parts and emit an audible signal at a frequency of around 3150 hertz. The subject timing system may be made particularly responsive by being tuned to 3150 hertz, although the timing system may be readily tuned to accommodate other whistles or audible signaling devices of other frequencies.

In a basketball game there are three officials on the floor, anyone of whom may signal for the stopping of timer display clock 10. However, the subject invention is readily applicable to various other sporting events such as football, wrestling, hockey, and lacrosse, or other events utilizing a different number of officials. Each of the sports officials carry a microphone 3a, 3b and 3c in close proximity to whistles 2a, 2b and 2c. Sports officials typically grip the whistles 2a, 2b and 2c in their teeth during periods of play such that the microphones 3a, 3b and 3c may conveniently be attached by a clip to the whistle cords typically worn by officials around their neck, or alternatively the microphones may be clipped in the vicinity of the neck portion of the shirt worn by the official in order to be in relatively close proximity to the whistles. Spring clips indicated as 7a, 7b and 7c may be provided for attaching microphones 3a, 3b and 3c respectively to the sports officials.

Each of the sports officials also carry a radio transmitter 4a, 4b and 4c which may be conveniently attached to the clothing or belts of the officials by suitable clips or fastening means 14a, 14b and 14c. The radio transmitters 4a, 4b and 4c may conveniently be commercial radio transmitters commonly utilized by performers and actors such as the Samson model ST-2 selected to operate at different separated carrier or center frequencies; such as, for example, 195.6 megahertz, 208.2 megahertz and 213.2 megahertz or other suitable frequencies. the frequencies are selected to be different than television transmission frequencies and their harmonics, and different than other radio and electronic communication equipment which may be present in a sports arena and used for security, announcing, and television crew communications. For example, television signals which are present in a stadium, such as an indoor basketball facility, operate at 80 megahertz with the third harmonic being 240 megahertz, a frequency which would be avoided to minimize electronic interference with the communications system of the subject invention.

Microphones 3a, 3b and 3c may conveniently be a Crown Countryman which is small and lightweight, includes a clip such as 7a, and has been found to work well with the Samson model ST-2 frequency modulated (hereinafter FM) transmitters 4a, 4b and 4c respectively, to which they are connected. Antennas 6a, 6b and 6c mounted on transmitters 4a, 4b and 4c respectively transmit electromagnetic radio waves 8a, 8b and 8c to radio receivers 11b, 11b and 11c, respectively. Receivers 11a, 11b and 11c are Samson model SR-22 commercial receivers with receiving sections 11a, 11b and 11c operating on the same frequencies as transmitters 4a, 4b and 4c, respectively. Each of the model SR-22 receivers 11a, 11b and 11c include a pair of antennas such as 12a and 13a which provide directional and tracking capability for the receivers to enable reliable reception of radio waves 8a, 8b and 8c from anywhere on the playing area of the sports arena. The receivers 11a, 11b and 11c and the associated control equipment described below may in a basketball event be conveniently mounted on the table in front of the official timer which is positioned immediately adjacent the central region of the playing area or floor.

In sports utilizing a larger playing area or field, such as soccer it may be desirable to position radio receivers such as 11a, 11b and 11c around the field to ensure reliable reception of radio signals such as 8a, 8b and 8c. The directional antenna system and coverage by antennas 12a and 13a associated with each receiver can be positioned to enhance the coverage. These remote receivers could be in addition to corresponding receivers at the official timers position which would be tuned to the same frequencies as the remote receivers with the outputs of all of the radio receivers connected at the inputs 14a, 14b and 14c of mixer 15. The number and positioning of radio receivers such as 11a, 11b and 11c can be varied to ensure reliable radio reception from the particular playing area. For example, more than one of the radio receivers can be tuned to the same carrier frequency, that is tuned to receive a radio signal from the same sports official such as Official A, Official B or Official C.

Transmitted radio signals 8a, 8b and 8c are received and amplified by radio receivers 11a, 11b 11c respectively, and are then fed as signals 14a, 14b and 14c respectively through mixer 15, and then through high band pass filter 16 and low band pass filter 17 to controller 20. Low band pass filter 17 is tuned to a center frequency of 400 hertz while high band pass filter 16 is tuned to a center frequency of 3150 hertz. Band pass filter 16 is thus turned to the normal frequency of whistles 2a, 2b and 2c to selectively pass a received whistle signal while rejecting other frequencies. Low band pass filter 17 is tuned to receive and pass 400 hertz signals which may be generated manually by the sports officials by actuation of buttons 5a, 5b and 5c on transmitters 4a, 4b and 4c, respectively. The band pass filters 16 and 17 attenuate any signals outside the pass band and thus filter out undesired electromagnetic signals and radio interference. Generation of the 400 hertz signal for manual actuation of display clock 10 is described below in more detail in connection with FIG. 2.

The 3150 hertz first radio control signal 19 is provided at the output of high band pass filter 16 to controller 20 in response to the frequency modulation of the carrier frequency of an FM transmitter such as 4a, 4b and 4c by sounding of whistle 2a, 2b or 2c. A second radio control signal 18 is provided at the output of low band pass filter 17 to controller 20 in response to manual actuation of manual control buttons 5a, 5b or 5c by the sports officials. Band pass filters 16 and 17 may be those sold commercially by Marchand Electronics and identified as their XM-16 crossover. Mixer 15 is a 3 line input mixer sold by Radio Design Laboratories and identified as their model ST MLX-3.

Controller 20 is positioned on the table in front of the official timer and includes conventional manual timer start button 21 and manual timer stop button 22 which enable independent and conventional starting and stopping of the timer or display clock 10 in the manner normally done by the official timer. In addition to the start and stop signals provided by the official timer by actuation of timer start button 21 and timer stop button 22, respectively, first radio control signal 18 and second radio control signal 19 are provided to controller 20 by way of frequency modulation of the carrier frequencies of transmitters 4*a*, 4*b* or 4*c* to provide an alternate, parallel remotely actuated control which is automatic, substantially instantaneous, and independent of the response time of the official timer in actuating display clock 10 upon blowing of a whistle 2*a*, 2*b* or 2*c* by a sports official.

It is to be appreciated that there is a time delay in the manual actuation of a push button such as timer stop button 22 by the official timer because of inherent cumulative delays. Even assuming that the official timer is positioned adjacent to the midcourt or central area of the playing area, the official timer may be in excess of 70 feet from a given official at the far corner of the floor in the case of college basketball, and in the case of sports such as football or lacrosse may be as much as 200 feet or more from the official blowing a whistle. Since sound propagation in air at normal pressure and temperatures is in the order of 1100 ft./second there is a necessary inherent delay in the sound from a whistle reaching the ear of the official timer. Added to that delay is the reaction time of the official timer in identifying or recognizing the whistle, and then in manually responding by pressing manual stop button 22 in order to stop timer display clock 10. The cumulative delays can be in the order of a significant portion of a second even with experienced official timers having rapid response reflexes. It has been estimated that in an officiated basketball game there are in the order of 80 or more whistles blown per game requiring the stopping of the clock. With a good rapid manual response time of the official timer of even 0.6 seconds this represents the loss of almost a minute or more in a game which may only be 40 minutes of playing time long.

More significant, and by way of example, in a closely contested basketball game where time is running out and is being counted in tenths of a second, and where the scores, for example, of the competing teams may be separated by only 1 point or 2 points, a single score such as a basket can change the very outcome of the game. The remaining game time in seconds and tenths of a second become very critical since a team can inbound and score a basket in one second or even less. It is not uncommon for there to be a controversy in the final seconds of such a closely contested game as to the proper reaction of the official timer such that the sports officials are forced to confer and determine whether the time clock should be changed by adding or subtracting a second or more to the remaining time indicated by display clock 10.

In contradistinction to the time-consuming cumulative delays resulting from the official timer manually actuated stop button 22, the present invention provides an accurate, faster (essentially instantaneous), and more consistent actuation of display clock 10 through use of the radio link provided by radio signals 8*a*, 8*b* and 8*c*. Since the microphones 3*a*, 3*b* and 3*c* are positioned close to their associated respective whistles 2*a*, 2*b* and 2*c*, namely a matter of only a couple of inches or so, the sound transmission between the two is reduced by a very large factor, as much as a hundred or more times faster than the time it takes to reach the ears of the official timer. After that, there is essentially no reaction time since radio waves travel at the speed of light, namely some 186,000 miles/second and the operation of the electronic switching circuitry is essentially instantaneous.

It may be desirable, and it is possible, for the official timer to utilize manual stop button 22 in the normal fashion in parallel with the remote actuation as a back up and double check, although in practice remote radio control signals 18 and 19 will invariably have stopped display clock 10 prior to the actuation of the manual stop button by the official timer.

It may be also desirable in some situations to enable the sports officials to also manually stop the clock through actuation of push buttons such as 5*a*, 5*b* and 5*c* on transmitters 4*a*, 4*b* and 4*c* respectively. Since there are many events for restarting a clock such as the shot clock as contrasted with the game clock one or more manual additional start buttons 26*a*, 26*b* and 26*c* and an associated tone or frequency generating signal equipment could be provided to enable a sports official on the floor to also restart the game or shot clock. Push buttons 26*a*, 26*b* and 26*c* on transmitters 4*a*, 4*b* and 4*c* respectively may be provided along with additional tone circuitry on circuit boards 25*a*, 25*b* and 25*c* for starting timer display clock 10.

Indicator lights 23*a*, 23*b* and 23*c* could be made responsive to the whistle signals received from transmitters 4*a*, 4*b* and 4*c*, respectively, to operate as a built-in test circuit to indicate that a signal is being received from each of radio transmitters 4*a*, 4*b* and 4*c*, respectively, and/or by their failure to glow to indicate a fault in the radio transmission of a particular transmitter. Alternatively, timing system 1 can be tested prior to a game, or at any break in the play, by sequentially blowing whistles 2*a*, 2*b* and 2*c* and observing whether each whistle stops timer clock 10, with the timer clock being restarted after each stop.

Figure 2:
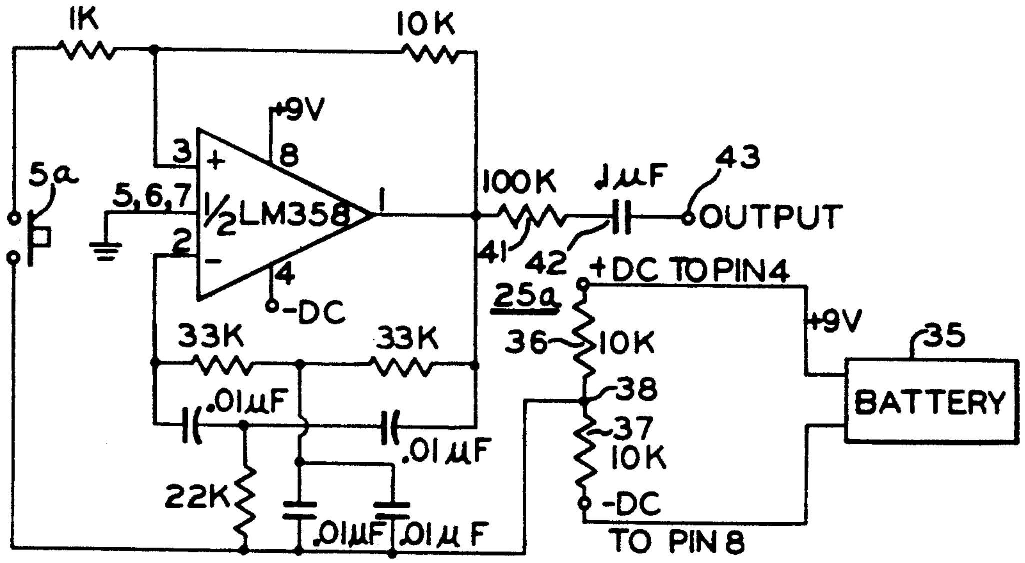
FIG. 2 is a schematic drawing showing the details of a portion of FIG. 1.

In order to generate a separate 400 hertz frequency or tone signal in response to actuation of the manual stop buttons 5*a*, 5*b* and 5*c*, or a manual start buttons 26*a*, 26*b* and 26*c*, one or more separate tone boards or circuit boards 25*a*, 25*b* and 25*c* are added to the commercial frequency modulated transmitters 4*a*, 4*b* and 4*c* respectively with the stop and start signals generating signals at different frequencies. The configuration of the 400 hertz manual stop tone boards 25*a*, 25*b* and 25*c* is shown in FIG. 2. Referring to FIG. 2, tone board 25*a* includes a semiconductor oscillator circuit utilizing one half of an LM358 semiconductor in the circuit shown and in which the resistors and capacitors are identified by their values. Nine volt battery 35 also supplies DC power to the remainder of the electronic circuitry of transmitter 4*a* and is connected through voltage divider resistors 36, 37 to provide DC power from center tap 38 to the tone circuit. Oscillation at a frequency of 400 hertz provides an output 400 hertz signal through the series output circuit of resistor 41 and coupling capacitor 42 to provide an FM signal, or tone, for transmittal of FM radio signal 8a by transmitter 4a via antenna 6a to receiver section 11a to provide a remote manual stop or second radio control signal 18 at the output of low band pass filter 17.

Additional oscillator circuitry such as 25a but tuned to a different frequency than 400 hertz can be provided on tone circuit boards 25a, 25b and 25c, or on separate tone boards, in transmitters 4a, 4b and 4c, respectively, to generate different frequency radio start signals which in combination with an additional band pass filter such as 16 and 17 at the official timer station but tuned to the different frequency could provide a third radio control signal connected in parallel with manual start button 21 (rather than in parallel with manual stop button 23 as in the case of radio control signals 18 and 19) to start timer display clock 10.

Figure 3:
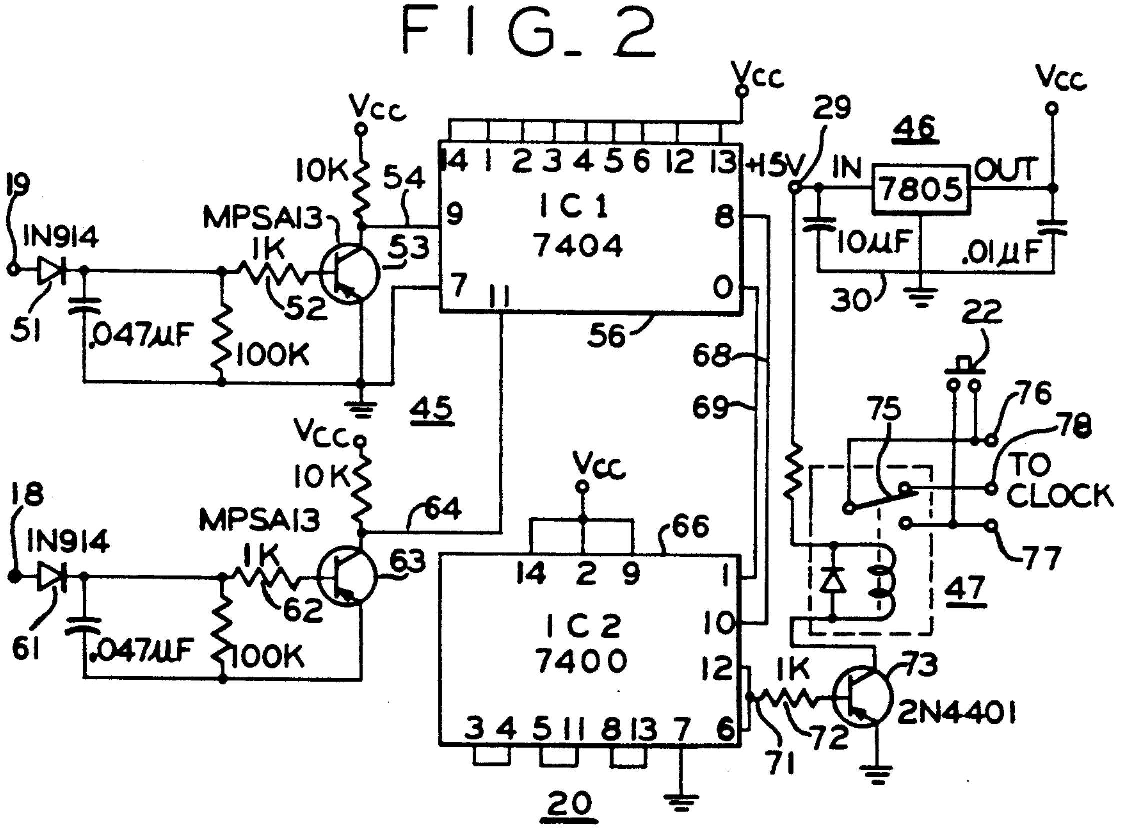
FIG. 3 is a schematic drawing of the controller portion of FIG. 1.

FIG. 3 shows circuit details of controller 20. Referring to FIG. 3, controller 20 includes electronic circuitry 45, 46 and switch or high speed relay 47. Whistle 2a, 2b or 2c actuated first radio control signal 19 is fed through diode 51 and resistor 52 to transistor 53. Manual switch 5a, 5b or 5c actuated second radio control signal 18 is similarly fed through diode 61 and resistor 62 to transistor 63. The outputs 54 and 64 of semiconductor circuits 53 and 63, respectively, are fed to first integrated circuit 56 which is connected via leads 68 and 69 to second integrated circuit 66 to provide a flip-flop circuit with a square-wave output switching signal 71 which is applied through resistor 7 to gate transistor 73 which is connected in circuit with switch or high speed relay 47. Actuation of high speed relay 47 moves relay arm 75 to open the circuit between terminals 76 and 78 to deenergize and stop display clock 10 (see FIG. 1). As shown in FIG. 3, either second radio control signal 18 provided by manual actuation of manual buttons 5a, 5b or 5c, or first radio control signal 19 provided by blowing of whistles 2a, 2b or 2c can stop display clock 10. As mentioned above, an additional manually operated button such as 26a, 26b or 26c could be utilized at transmitters 4a, 4b or 4c, respectively with additional tone boards similar to 25a, 25b and 25c but oscillating at a different frequency, to start or restart display clock 10 if desired in which case the resultant control signal would be connected in parallel with manual start button 21 to reclose the circuit through terminals 76 and 78 to power the display clock.

While the present invention has been described with respect to certain preferred embodiments thereof, it is to be understood that numerous variations in the details of construction, the arrangement and combination of parts, and the type of materials used may be made without departing from the spirit and scope of the invention.

What I claim is:

1. A remotely actuatable sports timing system comprising: a timer;

switching means to actuate said timer;

a portable remote radio transmitter suitable to be carried by a sports official;

a signaling device adapted to be carried by said sports official to emit audible signals representing decisions by said sports officials to actuate said timer;

a radio receiver for receiving a radio control signal transmitted by said transmitter in response to said audible signals and for generating a remote switching signal in response to said radio control signal;

and means to operate said timer in response to said remote switching signal.

2. The remotely actuatable sports timing system of claim 1 wherein said signaling device is a whistle.

3. The remotely actuatable sports timing system of claim 2 wherein said radio transmitter includes a microphone adapted to be carried by said sports official in proximity to said whistle.

4. The remotely actuatable sports timing system of claim 3 wherein said timer is a digital timer displaying one second time intervals.

5. The remotely actuatable sports timing system of claim 3 wherein a plurality of said sports officials each carry one said radio transmitter, and said timer is responsive to the earliest radio control signal received from any of the radio transmitters.

6. The remotely actuatable sports timing system of claim 5 wherein each of said radio transmitters are frequency modulated and operate on a different carrier frequency, and said radio receiver includes a separate circuit tuned to each of the different carrier frequencies.

7. The remotely actuatable sports timing system of claim 6 wherein means are provided to identify the radio transmitter from which said radio control signal has been transmitted.

8. The remotely actuatable sports timing system of claim 7 wherein said earliest control signal stops said timer.

9. The remotely actuatable sports timing system of claim 8 wherein said timer is a digital display timer with display capability of tenths of a second.

10. The remotely actuatable sports timing system of claim 5 wherein a manual switch is provided for use of an official timer to provide a manual switching signal in response to said audible signals, and said timer responds to the earliest of the manual switching signal or said remote switching signal.

11. The remotely actuatable sports timing system of claim 10 wherein said transmitter provides a second radio control signal manually operated by said sports official to actuate said timer.

12. The remotely actuatable sports timing system of claim 5 wherein said transmitter includes a tone circuit to generate a preselected frequency second control signal for frequency modulation of said radio transmitter for generation of said second radio control signal.

13. The remotely actuatable sports timing system of claim 12 wherein said receiver includes adjustable strength input channels and at least one band pass filter at a selected frequency to pass said radio control signal to generate said remote switching signal 14. The remotely actuatable sports timing system of claim 11 wherein an electronic controller circuit is provided to generate said switching signal in response to both said radio control signal and said second radio control signal.

15. The remotely actuatable sports timing system of claim 14 wherein a relay is provided for actuation in response to said switching signal and said timer is actuated in response to actuation of said relay.

16. The remotely actuatable sports timing system of claim 5 wherein said plurality of sports officials is three and the sport for which said timing system is applied is basketball.

17. The remotely actuatable sports timing system of claim 16 wherein said timer includes a digital display clock indicating seconds and tenths of a second.

18. The remotely actuatable sports timing system of claim 17 wherein the actuation of said timer by said radio control signals is more accurate and faster than can be obtained by the official timer actuating a manual switch for said timer in response to the sounding of said whistle by said sports officials.

19. The remotely actuatable sports timing system of claim 13 wherein one band pass filter is selected to pass said radio control signal.

20. The remotely actuatable sports timing system of claim 11 wherein said transmitter includes a manual switch to enable provision of said second radio control signal by said transmitter.

21. The remotely actuatable sports timing system of claim 20 wherein there are two band pass filters and one of said band pass filters is tuned to pass said radio control signal, and another of said band pass filters is tuned to pass said second radio control signal, and said switching signal is generated in response to both said radio control signal and said second radio control signal.

22. The remotely actuatable sports timing system of claim 21 wherein means are provided to indicate reception of a radio control signal for system test purposes.

23. The remotely actuatable sports timing system of claim 21 wherein a third radio control signal is provided to generate a start switching signal to start said timer.

24. The remotely actuatable sports timing system of claim 2 to cover a sports playing area wherein a plurality of radio receivers are positioned at separate locations about said playing area.

25. The remotely actuatable sports timing system of claim 24 wherein more than one of said plurality of radio receivers are tuned to the same carrier frequency.

* * * * *